United States Patent
Divo et al.

(10) Patent No.: US 7,429,106 B2
(45) Date of Patent: Sep. 30, 2008

(54) AUTOMATIC METHOD OF VERIFYING AT LEAST ONE CENTERING CHARACTERISTIC OF AN OPHTHALMIC LENS PROVIDED WITH MARKINGS

(75) Inventors: Fabien Divo, Charenton (FR); Cédric Lemaire, Charenton (FR)

(73) Assignee: Essilor International, Charenton-Le-Pont (FR)

( * ) Notice: Subject to any disclaimer, the term of this patent is extended or adjusted under 35 U.S.C. 154(b) by 167 days.

(21) Appl. No.: 10/582,139

(22) PCT Filed: Nov. 4, 2004

(86) PCT No.: PCT/FR2004/002829

§ 371 (c)(1),
(2), (4) Date: Jun. 8, 2006

(87) PCT Pub. No.: WO2005/066698

PCT Pub. Date: Jul. 21, 2005

(65) Prior Publication Data

US 2007/0115429 A1    May 24, 2007

(30) Foreign Application Priority Data

Dec. 10, 2003    (FR) .................................. 03 14464

(51) Int. Cl.
A61B 3/14    (2006.01)
A61B 3/10    (2006.01)

(52) U.S. Cl. ...................................... 351/206; 351/205

(58) Field of Classification Search ......... 351/205–223; 356/123–127
See application file for complete search history.

(56) References Cited

U.S. PATENT DOCUMENTS

| 5,152,067 A | 10/1992 | Kurachi et al. ................. 33/200 |
| 5,428,448 A * | 6/1995 | Albert-Garcia ............. 356/612 |
| 5,855,074 A | 1/1999 | Abitbol et al. ................ 33/507 |
| 5,973,772 A | 10/1999 | Fukuma et al. ............. 356/124 |
| 2002/0085196 A1 | 7/2002 | Fukuma et al. ............. 356/124 |

FOREIGN PATENT DOCUMENTS

| BE | 875 706 | 8/1979 |
| FR | 2 799 545 A1 | 4/2001 |

* cited by examiner

*Primary Examiner*—Mohammed Hasan
(74) *Attorney, Agent, or Firm*—Young & Thompson

(57) ABSTRACT

A method of verifying at least one centering characteristic of an ophthalmic lens provided with markings and mounted on a frame, the method includes:
a) positioning the ophthalmic lens on a support placed facing a pattern filter; b) using a diffuse light source to illuminate the ophthalmic lens through the pattern filter; c) using a digital camera to pick up the light transmitted by the ophthalmic lens; d) processing the signal output by the digital camera to determine the positions of the markings of the ophthalmic lens in a stationary frame of reference; e) determining the position of the support in the stationary frame of reference; and f) deducing the value of the centering characteristic from the known position of the support and from the positions of the permanent markings of the ophthalmic lens.

9 Claims, 5 Drawing Sheets

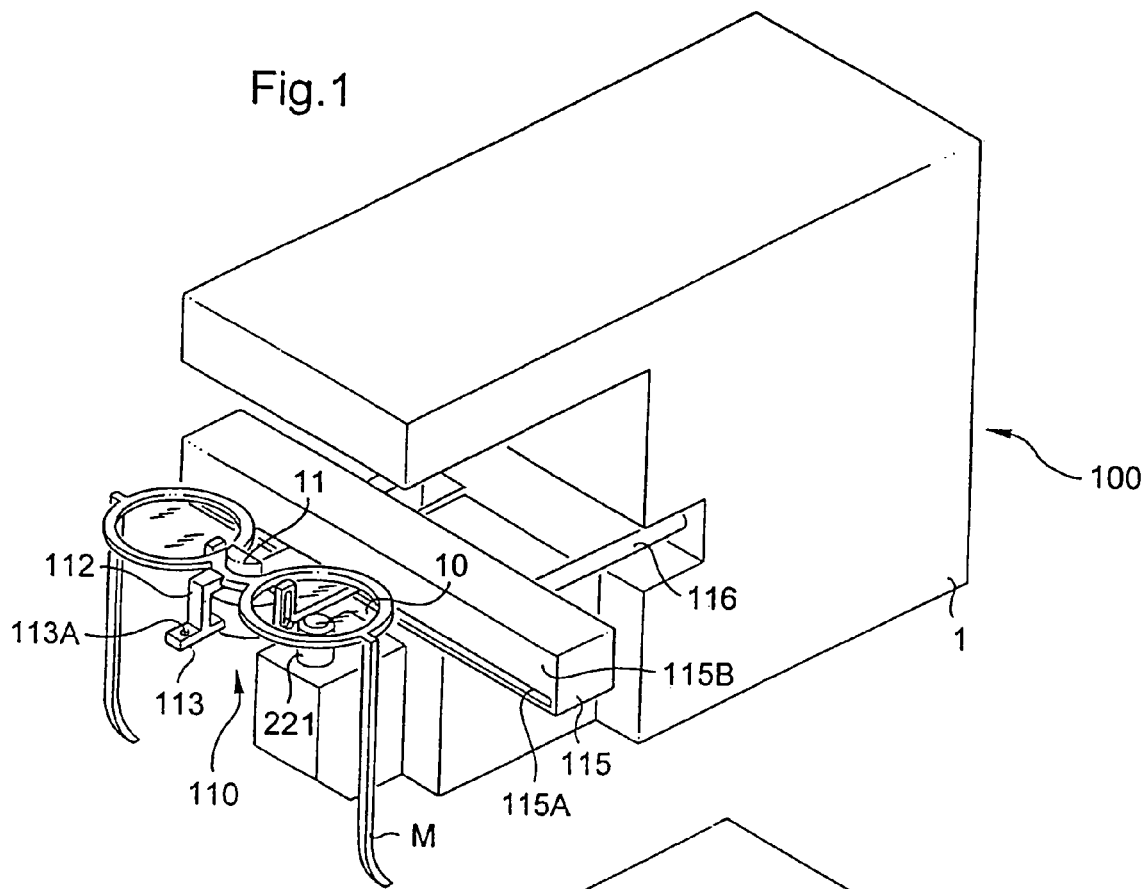

AUTOMATIC METHOD OF VERIFYING AT LEAST ONE CENTERING CHARACTERISTIC OF AN OPHTHALMIC LENS PROVIDED WITH MARKINGS

The present invention relates in general to detecting markings on an ophthalmic lens.

FIELD OF THE INVENTION

More particularly, the invention relates to an automatic method of verifying at least one centering characteristic of an ophthalmic lens with progressive power addition, which method makes use of locating markings of said lens.

BACKGROUND OF THE INVENTION

When mounting a progressive lens in a frame, it is important for the visual comfort of the user to ensure that the lens is properly positioned relative to the eye for which it corrects a refractive or accommodation defect.

The ophthalmic lens is centered when the reference center of the lens specified in its design and the center of the pupil of the eye are in alignment, or in other words, when the line of regard passes through the reference center of the lens. Centering is thus the result of bringing together two geometrico-optical givens: the morphology of the wearer's pupil and the position on the lens of the reference center.

During fabrication, every progressive lens is provided with temporary markings using paint, and with permanent markings using engraving. The temporary markings enable the lens to be centered conveniently prior to being mounted. The permanent markings make it possible on the patient's frame to identify the nature of the progressive ophthalmic lens, the value of its addition, and also to verify or reestablish the exact indexing of said lens, even after the temporary markings have been removed. It should be understood that the temporary marks are removed by the optician before handing the spectacles over to a customer and that, where necessary, they can be reestablished on the basis of the permanent engraved markings that remain on the lens.

More precisely, as shown in FIG. 10, the temporary markings conventionally comprise:

- a "fitting" or "centering" cross 11 identifying the center of the far vision zone that is to be positioned at the center of the wearer's pupil when the wearer is looking straight ahead at infinity; it serves to position the power progression of the lens 10 vertically relative to the eye so that, as intended by the designer of the lens, the wearer can easily find the correcting powers needed for far vision, intermediate vision, and near vision;
- a central point 12 locating the "optical center" of the lens 10 and situated 2 millimeters (mm) to 6 mm below the mounting cross 11, depending on the type of the lens; for a progressive lens, this "optical center" is conventionally the "prism reference" point where the nominal prismatic power of the lens 10 corresponding to the wearer's prescription is measured;
- a circle 13 for measuring the far vision power of the lens situated in the upper portion of the lens 10 immediately above the fitting cross 11 and locating the reference point for far vision; this is thus the place where a fronto-focometer should be placed in order to measure the far vision power of the lens 10;
- a circle 14 for measuring the near vision power of the lens and situated in the bottom portion of the lens 10, surrounding the center or reference point of the near vision zone; this center is offset towards the nose by 2 mm to 3 mm, and the distance between it and the fitting cross 11 constitutes the nominal length of the progression of the lens 10; and
- one or more lines 15 identifying the horizontal direction for the lens 10 and for use in centering.

As can also be seen in FIG. 10, the permanent markings generally comprise:

- two small circles or signs 16 located on the horizontal line of the lens 10 passing through its optical center and always situated 17 mm on either side of the optical center 12; these engravings serve to find the horizontal and vertical centering of the lens;
- a sign 17 serving to identify the trademark and the exact nature of the progressive lens (e.g. V for Varilux®) which is engraved under the nasal small circle or sign; and
- a two- or three-digit number representing the value of the addition (e.g. 30 or 300 for an addition of 3.00 D) which is engraved beneath the temporal small circle or sign.

It should be recalled that for multiple focus lenses presenting one or more lines of power discontinuity, said lines act as permanent markings.

The centering of a progressive lens comprises two components: a vertical component and a horizontal component.

Vertical centering enables the power progression of the lens to be positioned vertically in front of the eye in such a manner as to make it easy for the eye to find the needed correcting power in the manner intended by the designer of the lens. The far vision correction power should be reached on the axis of the primary position of regard and the near vision power on the axis of regard when lowered for near vision.

This vertical centering is conventionally performed by using the far vision centering cross that is painted for this purpose on the lens by the manufacturer: centering consists in positioning the centering cross of the lens in front of the center of the pupil of the patient's eye when looking at infinity. In practice, the optician measures the height between the bottom of the frame and the center of the wearer's pupil when looking horizontally, and positions the centering cross of the lens at the measured height.

Horizontal centering consists in positioning the progressive lens laterally relative to the eye in such a manner that the wearer can make optimum use of the zones for far vision, intermediate vision, and near vision.

Physiological studies have shown that in 25% of cases the centers of the pupils present horizontal asymmetry of more than 1 mm relative to the nose, and in 60% of cases a virtual offset of more than 1 mm. It is therefore advantageous to be able to verify the centering of each of the two lenses independently of the other, and that is why it is preferable to be able to measure the right and left half-distances between the pupils rather than measuring only the overall interpupillary distance.

By construction, all progressive lenses possess relative positioning of the far vision and near vision zones with the near vision zone being off-centered towards the nose relative to the far vision zone.

The horizontal centering of the lens can thus be undertaken either relative to near vision or relative to far vision (the more usual technique).

Centering relative to far vision consists in measuring the half-distances between the right and left pupils of the patient with a far vision regard, i.e. the distances between the root of the nose and the centers of the pupils (or more precisely of the corneal reflections) of the right eye and of the left eye. The far vision fitting crosses of the right and left lenses are then positioned at these distances from the mid or nasal plane of the frame.

With the lens appropriately oriented about its optical or central axis, with its horizontal lines (or engraved circles) in alignment on the horizontal of the frame, the near vision zone is found, by construction of the lens, to be appropriately off-centered towards the nose by 2 mm to 3 mm relative to the far vision zone.

Centering relative to near vision is performed more rarely, and is undertaken in analogous manner by measuring the half-distances between the pupils of the patient with near vision regard and by positioning the centers of the near vision zones of the left and right lenses at said distances.

This second technique presents a particular advantage when the right and left eyes converge asymmetrically.

OBJECTS AND SUMMARY OF THE INVENTION

In the context of the above description, the invention provides a method of verifying at least one centering characteristic of an ophthalmic lens provided with markings and mounted on a frame, the method comprising the following steps:

a) positioning the ophthalmic lens on a support placed facing a pattern filter;

b) using a diffuse light source to illuminate the ophthalmic lens through said pattern filter;

c) using a digital camera to pick up the light transmitted by the ophthalmic lens;

d) processing the signal output by the digital camera to determine the positions of the markings of the ophthalmic lens in a stationary frame of reference;

e) determining the position of the support in the stationary frame of reference; and f) deducing the value of said centering characteristic from the known position of the support and from the positions of the permanent markings of the ophthalmic lens.

Other characteristics of the method in accordance with the invention that are advantageous and non-limiting are as follows:

during step d) step e) is performed simultaneously;

in step e), the camera is used to pick up at least one positioning image formed in shadow by a passive pointer provided on the support;

in step b), said source of diffuse light is used to illuminate said support, in step c) said digital camera is used to pick up the light transmitted through said support, and in step e), the signal output from the digital camera is processed to determine the position of the passive pointer in the stationary frame of reference;

in step e) a signal emitted directly by the support at said passive pointer is picked up;

in step f) the half-distance between the pupils is determined by calculating the distance that exists between the position of the middle of the bridge of said frame given by one of the passive pointers of said support and the position of the central point of said ophthalmic lens situated in the middle of the straight line segment interconnecting the two corresponding permanent markings of said ophthalmic lens;

in step f), the height is determined by calculating the distance that exists between the position of the top or bottom edge of said frame and the position of the central point of said ophthalmic lens situated in the middle of the straight line segment interconnecting the two corresponding permanent markings of said ophthalmic lens; and in step e) the position of the support is deduced from an initial position determined during a preliminary initialization step and from a measured displacement of the support for placing the ophthalmic lens so that it faces the illumination means.

BRIEF DESCRIPTION OF THE DRAWINGS

The description below with reference to the accompanying drawings, given as non-limiting examples, makes it well understood what the invention consists in and how it can be implemented.

In the accompanying drawings:

FIG. 1 is a diagrammatic perspective view of the device of the invention with its lens support in a first position;

FIG. 2 is a diagrammatic perspective view of the device of the invention with its lens support in a second position;

MORE DETAILED DESCRIPTION

Figure 3:
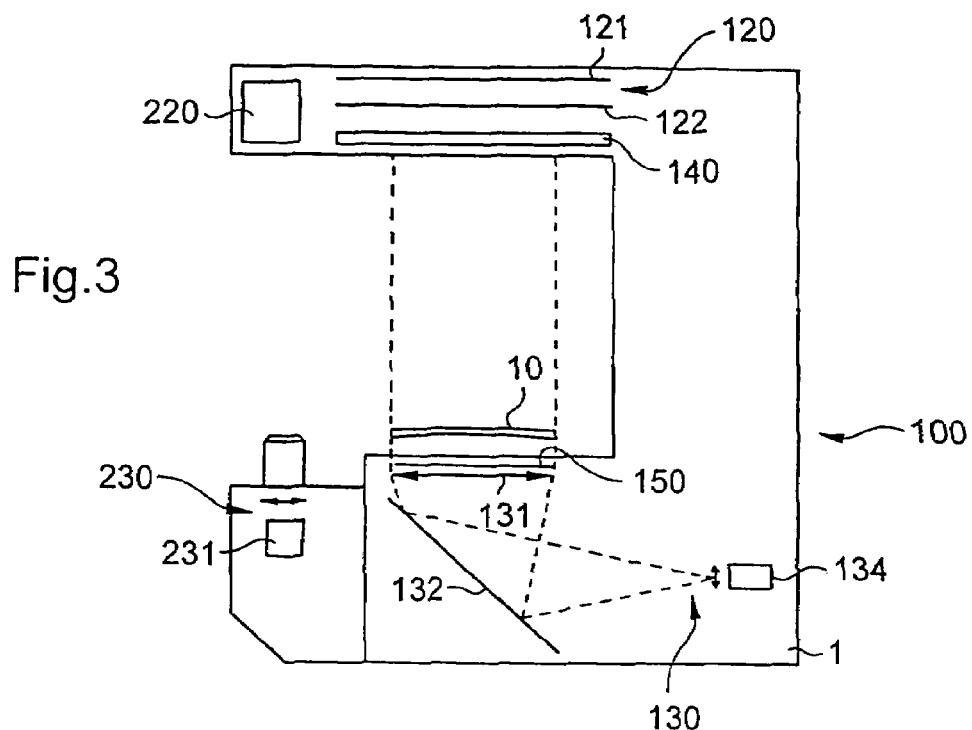
FIG. 3 is a diagrammatic side view showing the main internal components of the FIG. 1 device operating in tensiscope mode.

FIGS. 1 and 2 show a device 100 for automatically detecting various characteristics of an ophthalmic lens 10 provided with markings.

Advantageously, the device 100 combines at least three different functions, namely the "Pal Id" function, the tensiscope function, and the frontofocometer function.

Thus, in "Pal Id" mode, it serves to verify automatically at least one centering characteristic of an ophthalmic lens with progressive power addition (whether made of mineral or synthetic material) fitted to the frame of a patient and determining the positions of the permanent markings of said lens.

In tensiscope mode, it serves to detect and locate automatically any tensions existing in mounted ophthalmic lenses in order to verify that each ophthalmic lens is properly fitted to the frame.

Tensions in a mounted ophthalmic lens are due to poor machining of the lens which is too large relative to the rim receiving it. The lens is then under stress in the frame, thereby generating tensions that can damage it.

The principle used in a tensiscope consists in revealing the birefringence of the lens (the refractive index of the lens is no longer isotropic, but depends on the polarization direction of light), where this birefringence is associated with the stresses to which said lens is subjected.

To reveal such birefringence, a tensiscope comprises firstly a source of uniform light that is linearly polarized using a polarizer disposed immediately after the light source, and serving to illuminate the mounted ophthalmic lens, and secondly a second polarizer disposed after the lens and through which the optician observes the illuminated ophthalmic lens.

When there is no tension, the illuminated ophthalmic lens appears to be uniform to the optician.

When tensions are present, the optician sees colored or shaded fringes appear in said illuminated ophthalmic lens, the fringes being closer together in locations where the lens is stressed.

On seeing the observed colored or shaded fringes, the optician needs to evaluate what trimming needs to be undertaken on said lens so that it fits properly in the frame, i.e. without being stressed.

In frontofocometer mode, it enables the power at a reference point of an ophthalmic lens with progressive power addition to be measured or to be verified, or it makes it possible to identify and measure the powers of a single vision ophthalmic lens.

Most frontofocometers operate on the same optical principle as described in the document "Paraxial optics" by W. F. Long in Visual Optics and Instrumentation, Ed. N. Charman, Macmillan Press, London 1991, pages 418-419.

Previously known frontofocometers can be fitted with system for marking and holding a lens that has not been mounted (with bearing fingers or a lens clamp) of the type sold under the trademark Essilor ACL 60 by the supplier Visionix or under the trademark Essilor CLE 60 by the Japanese supplier Shin Nippon.

The device 100 comprises a structure 1 forming a box containing various optical elements, and having mounted thereon a support 110 adapted to receive a spectacle frame fitted with ophthalmic lenses 10.

Figure 5:
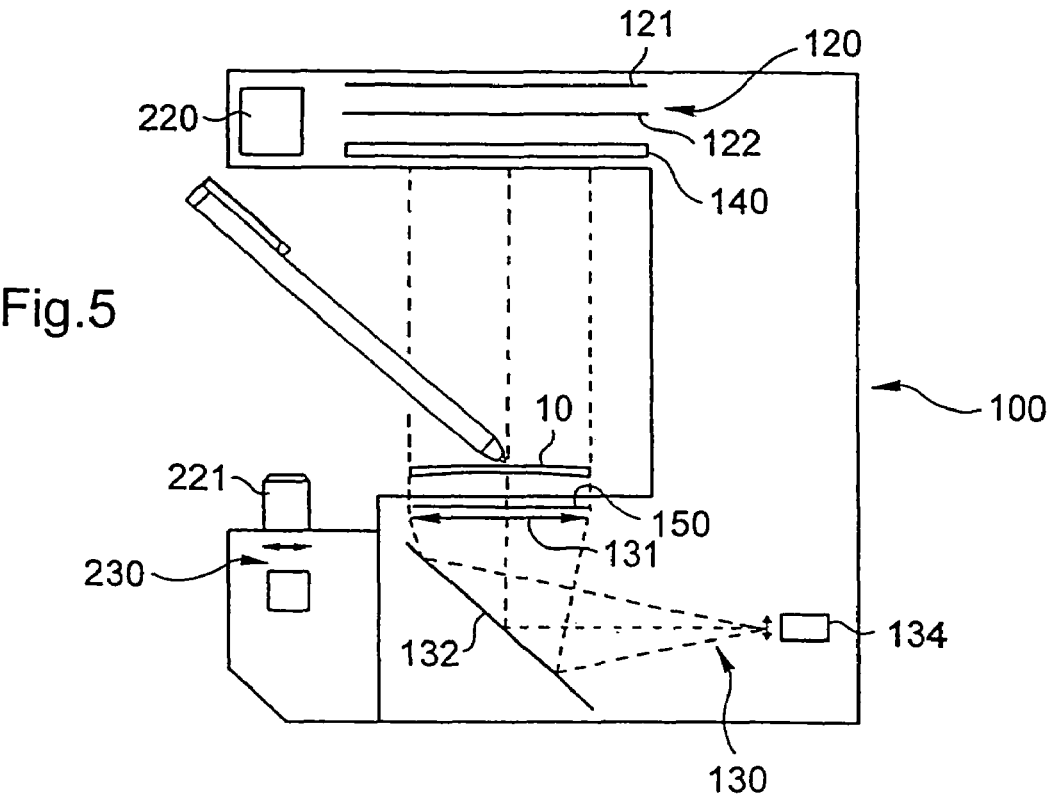
FIG. 5 is a diagrammatic side view showing the main internal components of the FIG. 1 device operating in Pal Id mode for ophthalmic lenses of synthetic material.

As shown in FIGS. 3 and 5, the device 100 includes on either side of the support 110 firstly first illumination means 120 for illuminating the ophthalmic lens 10 installed on the support 110, and secondly first acquisition and analysis means 130 for acquiring and analyzing the light transmitted through said lens 10.

Said first illumination means 120 are preferably activatable and deactivatable.

They comprise a source 121 of white light and a diffuser 122 for illuminating the ophthalmic lens 10 with diffuse light.

In this example the first acquisition and analysis means 130 comprise a digital camera 134. They also comprise, between a downstream polarizing filter 150 and the digital camera 134, an optical system for deflecting light rays, the system comprising a converging lens 131 and a mirror 132 inclined at 45°. Said first acquisition and analysis means 130 also comprise image processor means (not shown) adapted to process the signal obtained at the output from the camera 134, and display means (not shown) for displaying the processed signal.

Figure 6:
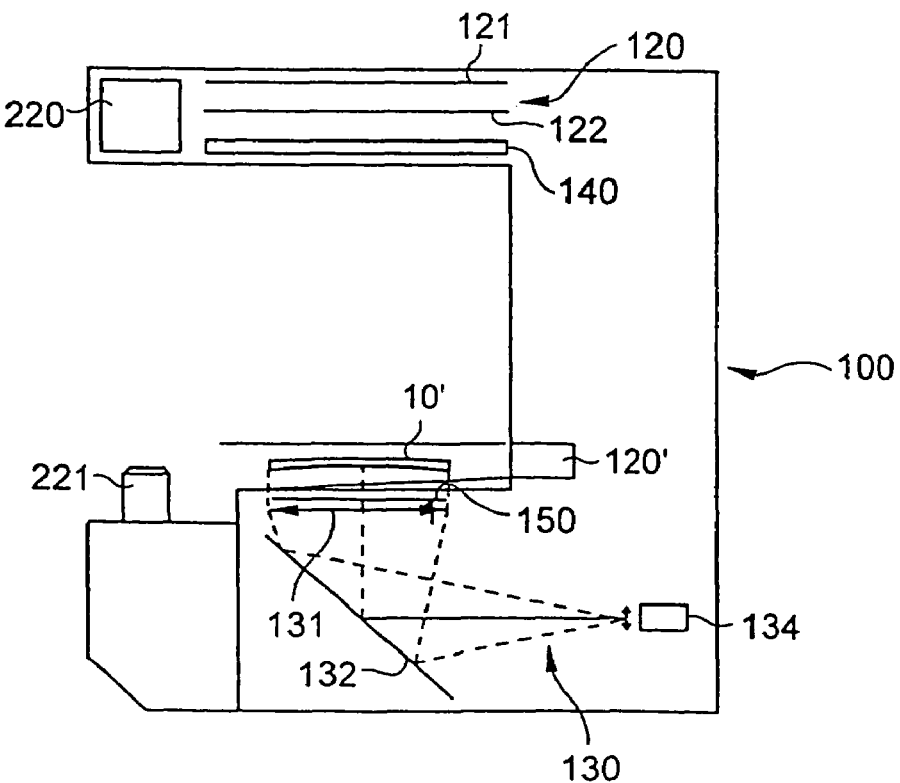
FIG. 6 is a diagrammatic side view showing the main internal components of the FIG. 1 device operating in Pal Id mode for ophthalmic lenses made of mineral material.

As shown in FIGS. 5 and 6, in order to perform the "Pal Id" function on ophthalmic lenses of synthetic material, the device 100 includes, between said illumination means 120 and said support 110, an activatable and deactivatable filter 140 having patterns that are repeated and regular.

This pattern filter 140 is advantageously constituted by a liquid crystal screen (LCD).

Figure 4A:
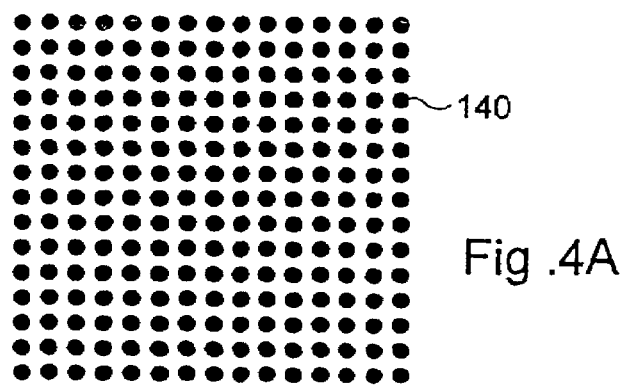
FIGS. 4A and 4B are diagrammatic plan views of two filters having different patterns for the device of the invention.
Figure 4B:
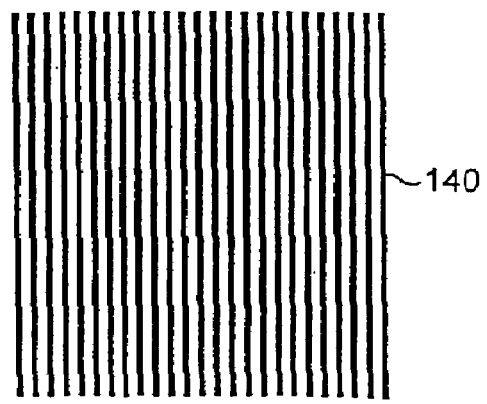

FIGS. 4A and 4B show two filters 140 having different patterns activated, one comprising a screen of black dots on a transparent background, and the other a screen of black stripes on a transparent background.

The device 100 also includes two polarizing filters, an upstream polarizing filter disposed between said first illumination means 120 and said support 110, and a downstream polarizing filter 150 disposed between said filter 110 and said first acquisition and analysis means 130.

These two polarizing filters associated with the first illumination means 120 and with the first acquisition and analysis means 130 enable the device 100 to perform its tensiscope function (see FIG. 3). The polarization of the two filters is arranged in a common direction (and not in two perpendicular directions as in a conventional tensiscope with crossed polarizing filters), so as to enable other functions to be implemented and in particular the "Pal Id" function without the two filters blocking off light. It can be understood that a combination of crossed filters would block off light in zones of lenses where there is no tension, which would prevent any identification or measurement thereof. In addition, this common polarization direction of the two filters should be substantially identical to the polarization direction of the lens under analysis. Otherwise, zones of the lens having no tension would block off light in combination with the two filters, and that would likewise prevent any identification or measurement on the lens. In practice, the polarization is therefore generally horizontal relative to the configuration of the lens in use.

When activated, the pattern filter 140 serves to reveal the permanent markings of the synthetic material ophthalmic lens 10 placed on said support 110 interposed between said first illumination means 120 and said first acquisition and analysis means ("Pal Id" function). When deactivated, the liquid crystal screen forming the pattern filter 140 enables another measurement to be performed on said ophthalmic lens 10 since it also forms the upstream polarizing filter disposed between said first illumination means and the lens (tensiscope function).

As shown in FIG. 6, the device 100 further comprises second illumination means 120' that are activatable and deactivatable, and that are adapted to illuminate an ophthalmic lens 10' of mineral material installed on said support 110 with light at grazing incidence, said first acquisition and analysis means 130 being suitable for analyzing the light beam transmitted through said lens 10' illuminated in grazing incidence light. These second illumination means 120' serve to reveal the permanent markings on ophthalmic lenses made of mineral material ("Pal Id" function). Naturally, for this operation, the first illumination means 120 must be deactivated so use can be made of the second illumination means 120'.

As shown more particularly in FIGS. 3 and 5, in order to perform the frontofocometer function, the device 100 includes power measurement means adapted to take a measurement at a power reference point of the ophthalmic lens 10. In the example described, these power measurement means comprise third illumination means 220 disposed laterally relative to said first illumination means 120, and adapted to generate a light beam directed onto an ophthalmic lens installed on said support 110 positioned facing said third illumination means 220. Furthermore, downstream from a frontofocometer endpiece 221 including a Hartmann mark, it also includes second acquisition and analysis means 230 for acquiring and analyzing the light beam transmitted through said lens installed on said support 110 facing said frontofocometer endpiece 221. These second acquisition and analysis means 230 comprise a camera 231.

As shown in FIGS. 1 and 2, the support 110 is more particularly adapted to support a spectacle frame M of a patient.

Figure 9:
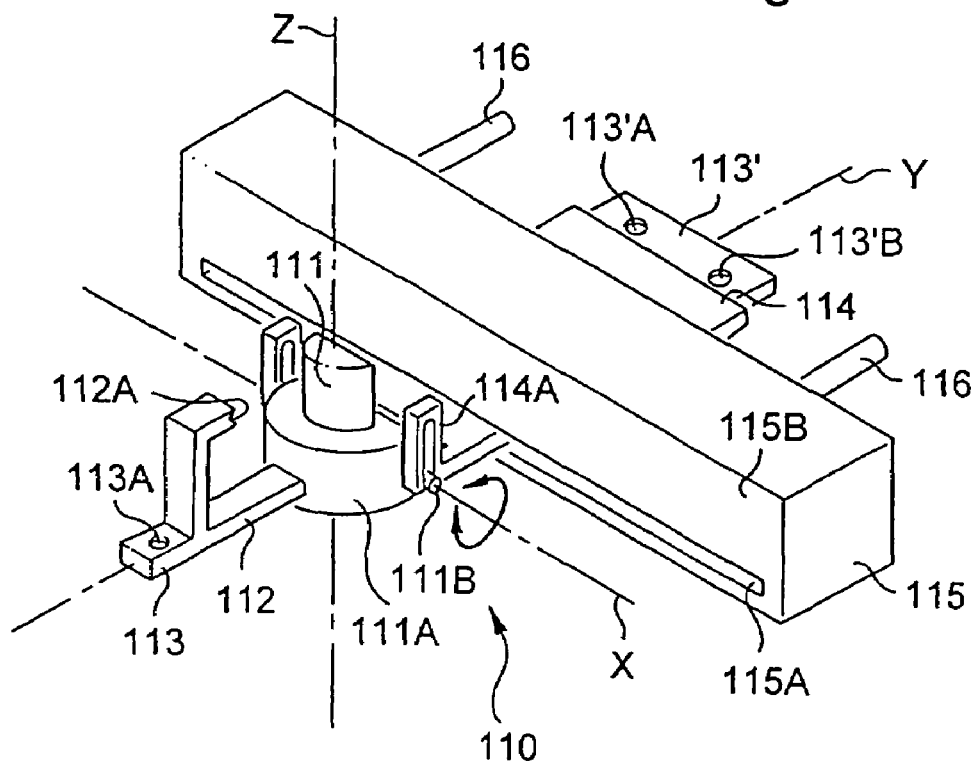
FIG. 9 is a diagrammatic perspective view of the support of the FIG. 1 device.

For this purpose it comprises a nose 111 and a clamping jaw 112 suitable for clamping onto the spectacle frame M (see FIG. 9).

The nose 111 is a half-cylinder rising from a cylindrical base 111A. The clamping jaw 112 is attached to the cylindrical base 111A and includes an upside-down L-shaped portion with a free end having a notch 112A facing the nose 111.

Thus, the bridge of the frame M rests on the cylindrical base 111A and is clamped between said notch 112A of the clamping jaw 112 and said nose 111.

Advantageously, the clamping jaw 112 is movable in translation relative to said nose 111 while being urged permanently towards an initial position relative thereto by resilient return means (a spring that is not shown) so as to guarantee proper clamping of the bridge of the frame M and thus ensure that said frame M is held in a stationary position on said support 110.

More particularly, the clamping jaw 112 has a slide that slides in a groove (not shown) in the cylindrical base 111A and containing the spring for returning said jaw into position.

Advantageously, the support 110 is movable in translation in a plane along two mutually perpendicular axes X and Y in order to take up different positions for measuring the characteristics of the ophthalmic lens 10 corresponding to the various modes of operation of the device 100, as explained in greater detail below (see FIGS. 7 and 8).

To do this, the nose 111 of the support 110 is attached to a slider portion 114 suitable for sliding in a groove 115A of a strip 115 extending along the X axis, and the strip 115 carries rods 116 that extend along the Y axis and that are for sliding in corresponding ducts (not shown) in the structure 1.

Advantageously, said nose 111 attached to said slider portion 114 via the cylindrical base 111A is suitable for being displaced in translation along the Y axis relative to said strip 115 while being continuously urged towards an initial position relative to said strip 115 by resilient return means (in this case a spring that is not shown). This makes it possible to put the bottom edge of the frame M into contact with the corresponding edge 115B of the strip 115.

Said support 110 is preferably displaceable along a third axis Z perpendicular to the first two displacement axes X and Y. This makes it possible in frontofocometer mode to raise the support 110 and thus the frame M so as to place one of the ophthalmic lenses 10 and then the other lens in the appropriate measurement position without striking the frontofocometer endpiece 221. In addition, the nose 111 of the support 110 is mounted to pivot on said slider portion 114. As shown more particularly in FIG. 9, the cylindrical base 111A carries two projecting studs 111B in alignment that form the pivot axis X. These studs 111B are mounted in slots formed in two lugs 114A provided at the end of said slider portion 114. This pivoting of the nose 111 of the support 110 serves in frontofocometer mode to enable the corresponding ophthalmic lens 10 to be properly positioned relative to the frontofocometer endpiece 221.

In order to enable the device 100 to identify the position of the support 110 in a stationary frame of reference (represented by the structure 1), it may include, in a first embodiment, measurement means (not shown) for measuring its displacement relative to an initial position. Such measurement means comprise incremental encoders, for example such as the incremental encoders manufactured by the supplier Copal Electronics and sold under the reference RE20F-100-200.

In a preferred embodiment, said support 110 includes at least one passive pointer 113; 113' which, when illuminated by said first illumination means 120, forms in shadow an identification image on said first acquisition and analysis means 130 enabling the position of said support 110 in the stationary frame of reference to be determined.

Figure 7:
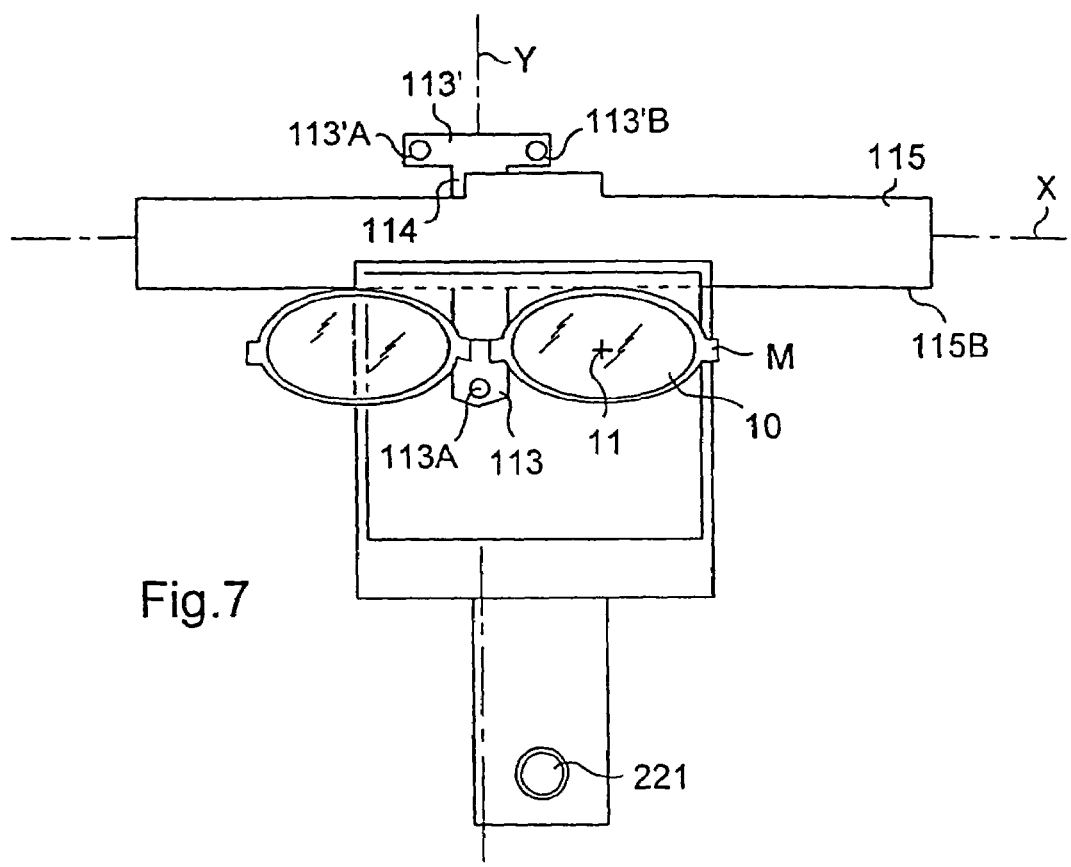
FIG. 7 is a diagrammatic plan view of an embodiment of the support of the FIG. 1 device positioned in the second position.
Figure 8:
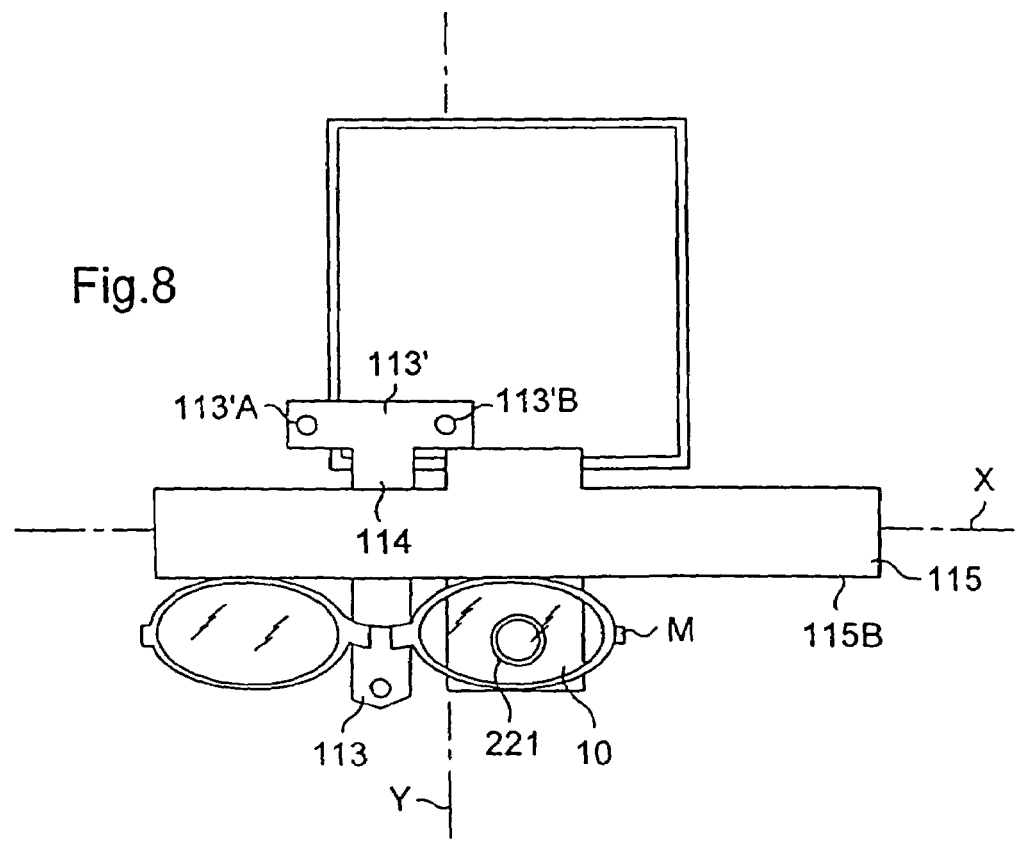
FIG. 8 is a diagrammatic plan view of an embodiment of the support of the FIG. 1 device positioned in the first position.

As shown in FIGS. 7 and 8, since said support 110 is movable between a plurality of positions for measuring the characteristics of said lens, it includes a plurality of passive pointers 113, 113' arranged in such a manner that at least one of the passive pointers 113, 113' is illuminated by said first illumination means 120 and forms in shadow an identification image on said first acquisition and analysis means 130, regardless of the measurement position taken up by said support 110.

Each passive pointer 113, 113' presents an outer or inner contour line 113A, 113A', 113B' that is polygonal, circular, or cruciform.

In this example, the support 110 includes, in front of said clamping jaw 112, one of the passive pointers constituted by a tongue 113 having an opening 113A of contour that is polygonal, circular, or cruciform.

Behind said strip 115, at the end of said slider portion 114, it also includes another of these passive pointers constituted by a tongue 113' having two openings 113'A, 113'B of contour that is polygonal, circular, or cruciform.

Thus, when the device 100 operates in frontofocometer mode on an ophthalmic lens 10 with progressive power addition, or on a multifocal lens with power discontinuity, it implements a method of verifying the power at a reference point of said lens, the method comprising the following steps:

a) positioning said ophthalmic lens 10 on said support 110;

b) displacing said support 110 so as to place the ophthalmic lens 10 facing the first illumination means 120 (see FIG. 2);

c) illuminating said ophthalmic lens 10 with said first illumination means 120 while the pattern filter is activated;

d) using the digital camera 134 of said first acquisition and analysis means 130 to pick up the light transmitted through the ophthalmic lens 10;

e) deactivating the pattern filter;

f) processing the signal from said digital camera 134 in order to determine the positions of the permanent markings 16 of the ophthalmic lens 10 (see FIG. 10) in a stationary frame of reference;

g) storing said position as an initial position of said ophthalmic lens 10;

h) using the incremental encoders to calculate the displacement of said ophthalmic lens 10 relative to said initial position in order to place said reference point facing said power measurement means 220, 230 (see FIG. 1);

i) moving said support 110 in compliance with the calculated displacement; and j) performing the power measurement at said reference point.

When the device 100 is operating in "Pal Id" mode, its pattern filter 140 is activated. It can then implement a method of verifying at least one centering characteristic of an ophthalmic lens 10 having progressive power addition, the method comprising the following steps:

a) acquiring an initial position for the support 110 in a stationary frame of reference;

b) positioning the ophthalmic lens 10 on the support 110;

c) displacing the support 110 to place the ophthalmic lens 10 facing said first illumination means 120 (see FIG. 2);

d) using the incremental encoders to measure the displacement of the support 110 relative to its initial position;

e) illuminating the ophthalmic lens 10 with said first illumination means 120;

f) using said digital camera 134 of said first acquisition and analysis means 130 to pick up the light transmitted through the ophthalmic lens 10;

g) processing the signal output by said digital camera 134 to determine the positions of the permanent markings 16 of the ophthalmic lens 10 in said stationary frame of reference; and h) deducing from the initial position of said support, from the measured displacement thereof, and from the positions of the permanent markings of said ophthalmic lens 10, the value of said centering characteristic.

The centering characteristics are conventionally the half-distance between the pupils and the mounted height of the ophthalmic lens 10 when fitted to its frame M.

In the above method, the position of the support 110 is deduced from an initial position determined during the preliminary initialization step a) and from a measured displacement of the support 110 while placing the ophthalmic lens facing the illumination means 120 (steps b) to d)).

Nevertheless, the device 100 can implement any other method of verifying at least one centering characteristic, in which the digital camera 134 is used to acquire the position of the support 110 with the help of one of the passive pointers 113, 113'.

This method comprises the following steps:

a) positioning the ophthalmic lens 10 on the support 110 placed facing the activated pattern filter 140;

b) using a diffuse light source 121, 122 to illuminate the ophthalmic lens 10 through said pattern filter 140;

c) using the digital camera 134 of the first acquisition and analysis means 130 to pick up the light transmitted through the ophthalmic lens 10;

d) deactivating the pattern filter;

e) processing the signal output by the digital camera 134 to determine the position of the permanent markings of the ophthalmic lens 10 in a stationary frame of reference;

f) determining the position of the support 110 in the stationary frame of reference; and g) deducing from the known position of the support 110 and from the positions of the permanent markings of the ophthalmic lens 10 the value of said centering characteristic.

Advantageously, in this method, during step e), step f) is performed simultaneously in which the camera is used to pick up at least one index point image formed in shadow by a passive pointer 113 provided on the support 110 (see FIG. 7).

More precisely, in step b), said support 110 is illuminated using said diffuse light source 121, 122 of said first illumination means 120, in step c) said digital camera 134 is used to pick up the light transmitted through said support 110, and in step f) the signal output by the digital camera 134 is processed in order to determine the position of the passive pointer 113A in the stationary frame of reference.

Naturally, in a variant, provision can be made in step e) to pick up a signal transmitted directly by the support 110 at the position of the stationary mark 113A.

Thus, in this method, as shown in FIG. 7, in step f), the half-distance between the pupils is determined by calculating the distance that exists between the position of the middle of the bridge of said frame M given by one of the passive pointers 113 of said support 110 and the position of the central point 12 of said ophthalmic lens 10 situated in the middle of the straight line segment interconnecting the two corresponding permanent markings 16 of said ophthalmic lens 10.

Figure 10:
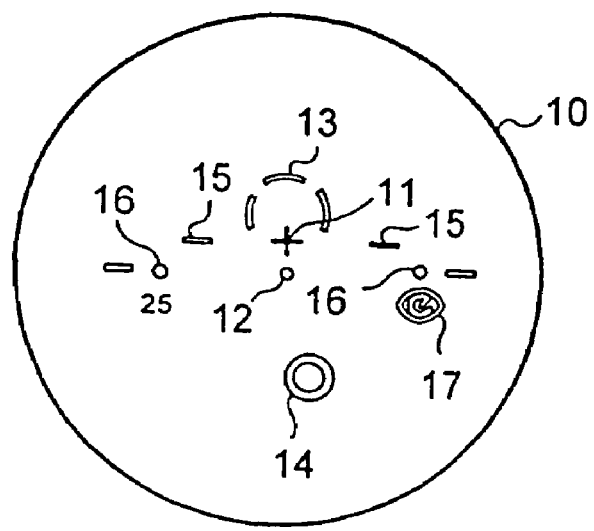
FIG. 10 is a diagrammatic plan view of an ophthalmic lens with progressive power addition provided with its temporary and permanent markings.

Also in this method, in step f), the height is determined by calculating the distance that exists between the position of the top or bottom edge of said frame M (as given by the edge 115A of the strip 115 seen by the digital camera 134) and the position of the central point 12 of said ophthalmic lens 10 situated in the middle of the straight line segment connecting the two corresponding permanent markings 16 of said ophthalmic lens 10 (see FIGS. 7 and 10).

More generally, the device 100 can implement a method of automatically detecting various characteristics of an ophthalmic lens 10 provided with markings, the method comprising the following steps:

with the ophthalmic lens 10 placed on said support 110, displacing the support 110 to position said lens in a measurement position;

using said first illumination means to illuminate said lens and at least one passive pointer of said support 110;

using said acquisition and analysis means 130 to pick up a digital file representative of the image of the lens 10;

deactivating the pattern filter;

using said acquisition and analysis means 130 to pick up a digital file representative of the positioning image formed in shadow by said passive pointer;

processing the digital files as picked up; and deducing therefrom the position of said support 110 and those of the markings of the lens in a stationary frame of reference.

The algorithm that enables the position of the support to be deduced from the captured image operates as follows:

binarizing the positioning image and retaining only those points having light intensity greater than a predefined threshold;

performing a segmentation operation: isolating and numbering the various items obtained by binarization (where an item is a cluster of contiguous pixels);

determining the characteristics (size, position of center of gravity) the various items;

sorting the items as a function of size: eliminating items of size much greater than or much smaller than the size of the passive pointer(s);

comparing the remaining items with the theoretical shape of the passive pointer(s) by correlating the retained items and a mask representative of the passive pointer(s); where correlation is a well-known image processing operation consisting in multiplying the representative mask with the item; the correlation is at a maximum when the mask and the item are completely identical;

retaining items for which the correlation is greater than a predefined threshold; at this stage there should normally remain only those items that correspond to the passive pointer(s);

determining the position of the passive pointer(s) in the image on the basis of the previously calculated centers of gravity of the corresponding items;

deducing therefrom the positions of the pointers in the stationary frame of reference, given knowledge of the transformation for converting the position of a pixel in the image into a position in millimeters in the stationary frame of reference; and deducing from the position(s) of the passive pointer(s) the position of the support.

The transformation serving to convert the position of a pixel in the image into a position in millimeters in the stationary frame of reference is defined when calibrating the device. For example, in order to determine this transformation, it is possible to make use of a transparent test chart positioned on the detection device that has a grid of known pitch silk-screened thereon. The test chart is indexed relative to the frontofocometer endpiece which constitutes the origin of the stationary frame of reference. Each intersection in the grid corresponds to a well-determined pixel and has coordinates that are well determined in the stationary frame of reference.

This provides the transformation from pixels to coordinates in the stationary frame of reference, and this transformation is stored in memory.

Once the device 100 has located the passive pointer 113 corresponding to the support 110 and the permanent markings 16 of the ophthalmic lens 10, it can deduce therefrom the values of the half-distances between the pupils and the mounted height of the ophthalmic lens fitted on the frame M.

As shown in FIG. 5, the optician can also use the device 100 merely for revealing the permanent markings of a raw ophthalmic lens so as to use a marker to mark these markings on said lens.

When the device 100 is used in tensiscope mode, the pattern filter 140 is deactivated and the LCD screen then forms a polarizing filter.

The optician uses the support 110 to place the ophthalmic lens fitted in its frame M facing said first illumination means 120, and more particularly between the upstream and downstream polarizing filters 140 and 150. It illuminates said lens 10 and the digital camera 134 captures the image of the lens 10.

Said device 100 can then provide one of the three following types of information:
  binary information indicating that the ophthalmic lens 10 is properly fitted in the frame M (i.e. without stress);
  binary information indicating that the ophthalmic lens 100 is properly fitted in its frame M, and if the frame is under too much tension, informing the optician of the amount of trimming to be machined away on said lens, possibly with the angular position of the trimming that is to be performed when it is to be applied to a fraction only of the periphery of the lens, so as to ensure that said lens is properly fitted in the frame M; or
  it displays the captured image of the lens 10 on a screen and the optician can then, on sight of said image, decide whether the lens is or is not properly mounted, and possibly also decide on the amount of trimming machining to be performed on said lens.

Finally, the optician can advantageously make use of the above-described device 100 for positioning and measuring on an ophthalmic lens the locations and possibly also the shapes of holes to be made in order to mount the temples of a rimless frame.

A drilling jig is placed on the support 110 and said support 110 is positioned facing said first illumination means 120. The drilling jig is illuminated and an image thereof is obtained using the digital camera 134. The device 100 then displays on a screen the image that has been obtained so as to enable the optician to simulate the mounting operations that are to be performed. Naturally, the information that is obtained can be delivered to a drill (not shown) that automatically makes the holes in said ophthalmic lens at the measured locations.

The present invention is not limited in any way to the embodiments described and shown, and the person skilled in the art can apply any variant thereto in accordance with its spirit.

What is claimed is:

1. A method of verifying at least one centering characteristic of an ophthalmic lens provided with engraved markings and mounted on a frame, the method comprising the following steps:
  a) positioning the ophthalmic lens on a support placed facing a pattern filter;
  b) using a diffuse light source to illuminate the ophthalmic lens through said pattern filter;
  c) using a digital camera to pick up the light transmitted by the ophthalmic lens and said pattern filter;
  d) processing the signal output by the digital camera to determine the positions of the engraved markings of the ophthalmic lens in a stationary frame of reference;
  e) determining the position of the support in the stationary frame of reference; and
  f) deducing the value of said centering characteristic from the known position of the support and from the positions of the engraved markings of the ophthalmic lens.

2. A method according to claim 1, wherein in step e), the position of the support is deduced from an initial position determined during a preliminary initialization step and from a measured displacement of the support for placing the ophthalmic lens so that it faces the illumination means.

3. The method according to claim 1, wherein said support is mobile.

4. The method according to claim 3, wherein in step e), the position of the support is deduced from an initial position determined during a preliminary initialization step and from a measured displacement of the support for placing the ophthalmic lens so that it faces the illumination means.

5. A method of verifying at least one centering characteristic of an ophthalmic lens provided with markings and mounted on a frame, the method comprising the following steps:
  a) positioning the ophthalmic lens on a support placed facing a pattern filter;
  b) using a diffuse light source to illuminate the ophthalmic lens through said pattern filter;
  c) using a digital camera to pick up the light transmitted by the ophthalmic lens;
  d) processing the signal output by the digital camera to determine the positions of the markings of the ophthalmic lens in a stationary frame of reference;
  e) determining the position of the support in the stationary frame of reference; and
  f) deducing the value of said centering characteristic from the known position of the support and from the positions of the permanent markings of the ophthalmic lens, wherein in step e), the camera is used to pick up at least one positioning image formed in shadow by a passive pointer provided on the support.

6. A method according to claim 5, wherein in step b), said source of diffuse light is used to illuminate said support, in step c) said digital camera is used to pick up the light transmitted through said support, and in step e), the signal output from the digital camera is processed to determine the position of the passive pointer in the stationary frame of reference.

7. A method according to claim 5, wherein in step e), a signal emitted directly by the support at said passive pointer is picked up.

8. A method according to claim 5, wherein in step f), the half-distance between the pupils is determined by calculating the distance that exists between the position of the middle of the bridge of said frame given by one of the passive pointers of said support and the position of the central point of said ophthalmic lens situated in the middle of the straight line segment interconnecting the two corresponding permanent markings of said ophthalmic lens.

9. A method according to claim 5, wherein in step f), the height is determined by calculating the distance that exists between the position of the top or bottom edge of said frame and the position of the central point of said ophthalmic lens situated in the middle of the straight line segment interconnecting the two corresponding permanent markings of said ophthalmic lens.

* * * * *